US010325274B2

(12) United States Patent
Tuteja et al.

(10) Patent No.: US 10,325,274 B2
(45) Date of Patent: Jun. 18, 2019

(54) TREND DATA COUNTER

(71) Applicant: Wal-Mart Stores, Inc., Bentonville, AR (US)

(72) Inventors: Bhupesh Tuteja, San Jose, CA (US); Amit Khanchi, Foster City, CA (US); Abhay Maruti Kamble, Cupertino, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 534 days.

(21) Appl. No.: 14/170,479

(22) Filed: Jan. 31, 2014

(65) Prior Publication Data

US 2015/0220940 A1 Aug. 6, 2015

(51) Int. Cl.
*G06Q 30/02* (2012.01)
*G06Q 30/06* (2012.01)

(52) U.S. Cl.
CPC ......... *G06Q 30/0201* (2013.01); *G06Q 30/02* (2013.01); *G06Q 30/0631* (2013.01)

(58) Field of Classification Search
CPC .............. G06Q 30/02; G06Q 30/0201; G06Q 30/0631; G06F 17/30424; G06F 17/30554; G06F 17/30876
See application file for complete search history.

(56) References Cited

U.S. PATENT DOCUMENTS

| | | | |
|---|---|---|---|
| 6,581,064 B1* | 6/2003 | Senjalia | G06F 17/30312 |
| 9,092,421 B2* | 7/2015 | Chowdhury | G06F 3/0482 |
| 2002/0198939 A1* | 12/2002 | Lee | H04L 29/06 |
| | | | 709/203 |
| 2004/0034773 A1 | 2/2004 | Balabine | |
| 2006/0064428 A1* | 3/2006 | Colaco | G06F 16/86 |
| 2006/0069589 A1* | 3/2006 | Nigam | G06F 17/274 |
| | | | 706/55 |
| 2006/0129446 A1* | 6/2006 | Ruhl | G06Q 30/02 |
| | | | 705/306 |
| 2006/0212491 A1 | 9/2006 | Agrawal | |
| 2007/0150368 A1* | 6/2007 | Arora | G06Q 30/02 |
| | | | 705/26.1 |
| 2008/0301123 A1* | 12/2008 | Schneider | G06F 16/2471 |
| 2010/0017603 A1 | 1/2010 | Jones | |

(Continued)

OTHER PUBLICATIONS

Stack Overflow, "How to ensure a timestamp is always unique?" post by Justin Waugh, Apr. 10, 2011, pp. 3-4.*

(Continued)

*Primary Examiner* — Renae Feacher
(74) *Attorney, Agent, or Firm* — Bryan Cave Leighton Paisner LLP

(57) ABSTRACT

Systems and methods are provided for collecting, sorting, and reporting data sets representing transactions, product reviews, social media product mentions, or the like. According to embodiments of the present disclosure, a trend aggregation system includes a backend data collector, a trend database, and a trend server. Data may be gathered from heterogeneous sources such as transaction records, product reviews posted by consumers on web sites, and product mentions posted on social network platforms. The data may be sorted and stored in a way to provide recall of trend data segments filtered according to selected parameters.

20 Claims, 5 Drawing Sheets

(56) References Cited

U.S. PATENT DOCUMENTS

| | | | | |
|---|---|---|---|---|
| 2010/0119053 A1* | 5/2010 | Goeldi | ............... | G06Q 10/00 379/265.09 |
| 2010/0121707 A1* | 5/2010 | Goeldi | ............... | G06Q 10/00 705/14.49 |
| 2010/0280882 A1 | 11/2010 | Faith | | |
| 2011/0004483 A1* | 1/2011 | Ting | ............... | G06Q 30/02 705/1.1 |
| 2011/0145398 A1* | 6/2011 | Bansal | ............... | G06Q 30/02 709/224 |
| 2011/0179114 A1* | 7/2011 | Dilip | ............... | G06F 17/30867 709/204 |
| 2011/0307312 A1* | 12/2011 | Goeldi | ............... | G06Q 10/00 705/14.6 |
| 2011/0320482 A1* | 12/2011 | Barbieri | ............... | G06F 17/30867 707/769 |
| 2012/0303411 A1* | 11/2012 | Chen | ............... | G06Q 30/02 705/7.31 |
| 2013/0073336 A1 | 3/2013 | Heath | | |
| 2013/0144862 A1* | 6/2013 | Ruhl | ............... | G06Q 30/02 707/710 |
| 2013/0346234 A1* | 12/2013 | Hendrick | ............... | G06Q 30/0631 705/26.7 |
| 2014/0067596 A1* | 3/2014 | McGovern | ............... | G06Q 30/02 705/26.7 |
| 2014/0079217 A1 | 3/2014 | Bai | | |
| 2014/0337436 A1 | 11/2014 | Hoagland | | |

OTHER PUBLICATIONS

Berger, Jonah and Iyengar, Raghuram, "Communication Channels and Word of Mouth: How the Medium Shapes the Mesage," 2013 by Journal of Consumer Research, Inc. • vol. 40 • Oct. 2013.*

Nelson, Ray, "How to Use Social Media for Market Research," Social Media Today, Mar. 19, 2013, https://www.socialmediatoday.com/content/how-use-social-media-market-research.*

Brandel, Mary, "Are you Listening?" Computerworld, Oct. 26, 2010.*

* cited by examiner

TREND DATA COUNTER

BACKGROUND

In recent time, social networks have pervaded the daily life of many millions of people. Hundreds of social networking and social sharing platforms, including microblogging and similar services, facilitate millions of shared messages on a daily basis. Many users post messages regarding recent purchases, product reviews, or simply to discuss products that hold interest to them. Merchants have attempted to utilize data culled from such messages to supplement traditional marketing and advertising activities and thereby profit from that data.

The challenges of gathering such data from a variety of heterogeneous platforms, aggregating that data, and presenting representations of that data to consumers in a useful format have proved difficult for merchants to overcome.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
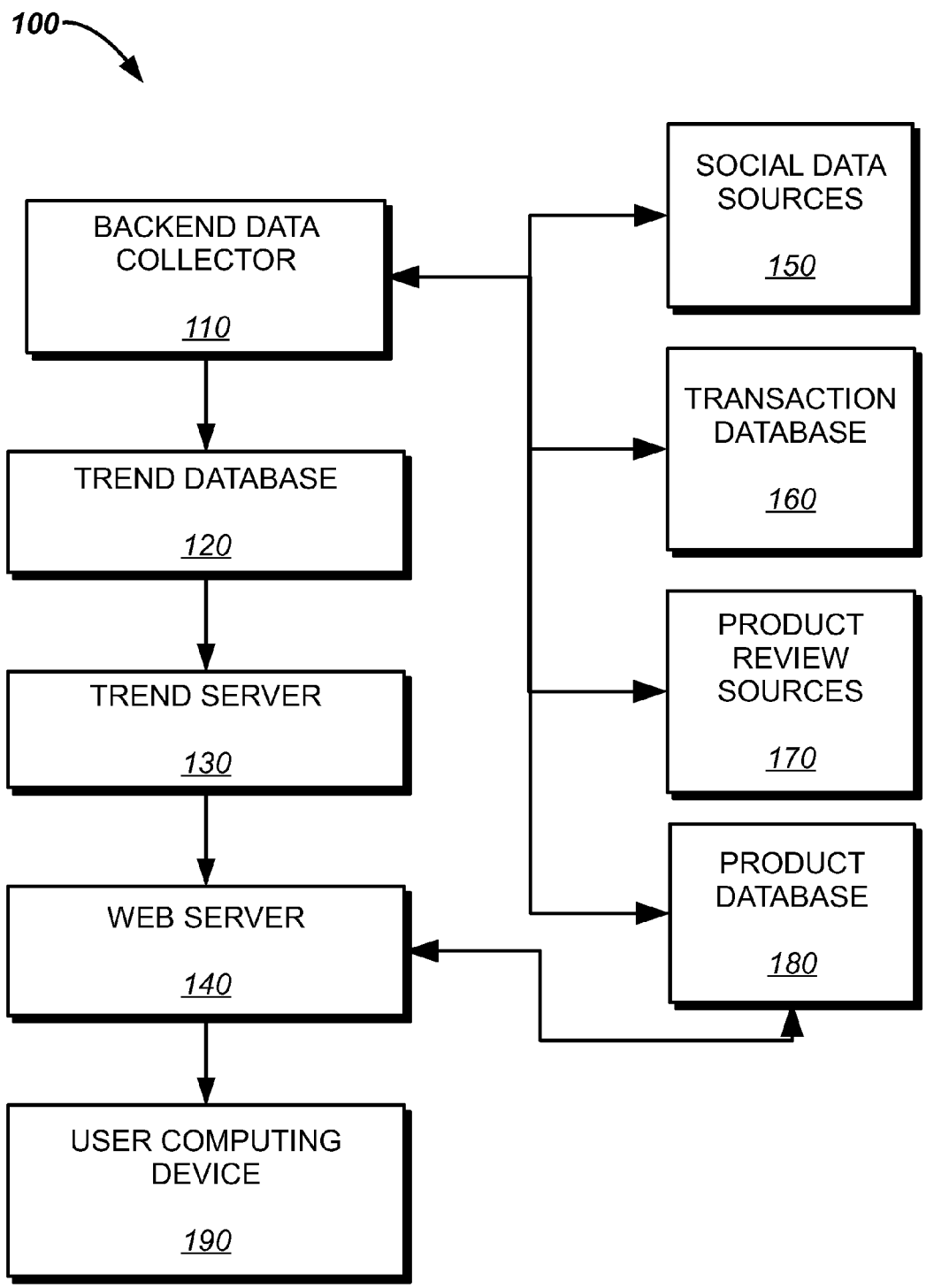
FIG. 1 is a block diagram illustrating components of a trend aggregation system according to an embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The present disclosure extends to methods, systems, and computer programs for presentation of aggregated trending data regarding item purchases and/or social media mentions in real-time or near real-time. In the following description, reference is made to the accompanying drawings that form a part hereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowcharts and block diagram in the attached figures illustrate the architecture, functionality, and operation of possible implementations of systems, methods, and computer program products according to various embodiments of the present disclosure. In this regard, each block in the flowchart or block diagram may represent a module, segment, or portion of code, which comprises one or more executable instructions for implementing the specified logical function(s). It will also be noted that each block of the block diagram and/or flowchart illustrations, and combinations of blocks in the block diagram and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

Embodiments of the present disclosure may provide real-time or near real-time trending products data aggregated from a variety of data sources relating to trend type activities. Such trend type activities may be depicted in terms of what products customers have recently reviewed, mentioned, and/or purchased. Such data may be collected and aggregated from social network platforms, transaction databases, and the like. Embodiments of the present disclosure can be implemented by a retailer to encourage potential customers to make purchases based on reviews and purchases by other people.

Referring to FIG. 1, according to embodiments of the present disclosure, trend aggregation system 100 comprises backend data collector 110, trend database 120, and trend server 130. In an embodiment, web server 140 is adapted to transmit a graphical user interface to users. The graphical user interface may comprise an e-commerce webpage. In embodiments, the graphical user interface is embodied in a webpage that is encoded in a markup language such as HTML and may be transmitted to a user computing device 190 for display to the user. Web server 140 can query trend server 130 for current trending products or services and transmit the trending information to the user device 190, as will be set forth in further detail. The graphical user interface may be transmitted to the user in one or more files via a communication network, including, for example, the Internet, from web server 140 to user computing device 190. In an embodiment, the user interface comprises an app installed on a user's mobile computing device 190 such as a smartphone. In such cases, the web server 140 can transmit computer-readable data to the user's mobile computing device 190, which device 190 can subsequently display a representation of the data to the user as trending products.

Social data sources 150 include social media platforms, social messaging platforms, and the like. Transaction database 160 comprises records of recent transactions. In embodiments, transaction database 160 includes product name, stock-keeping unit ("SKU") or like product identification code, pricing information, product category, date and time of transaction completion, and other data relevant to completed transactions. In an embodiment, product review sources 170 comprise one or more databases storing product reviews supplied by consumers. A product review source 170 can include a product identifier and a score assigned by the reviewer.

In embodiments, backend data collector 110 is adapted to traverse one or more social data sources 150 and seek reviews, mentions, or any other references of products. In one embodiment, backend data collector 110 searches product review sources 170 for reviews of a product having a quantifiable rating assigned by the reviewer (e.g., a number of stars given as part of the review). In other embodiments, backend data collector 110 searches for mentions of the product in social network messages, analyzes text strings for positive or negative terms that could be associated with the product, and assigns a rating score for the mention based on such positive and/or negative terms. Specific products can be identified in a particular social media message by matching keywords relating to the product with words in the message. In embodiments, backend data collector 110 is adapted to receive, from one or more transaction database 160, sales data corresponding to selected products.

According to an embodiment of the present disclosure, backend data collector 110 can collect data corresponding to multiple different trend types. As examples of trend types, an embodiment of backend data collector 110 collects data related to best-rated products, newly pinned products (e.g., a product highlighted by a user in the social sharing platform Pinterest), best seller products, recently reviewed products, just sold products, and/or products mentioned in other social platforms. In alternative embodiments, backend data collector 110 collects data related to other sets of trend types.

Embodiments of backend data collector 110 are further adapted to analyze and aggregate the sales data and transmit the aggregated data to trend database 120. In an embodiment, sales data received by backend data collector 110 includes a unique product identifier and a transaction timestamp. In another embodiment, sales data received by backend data collector 110 additionally includes a product category identifier. An embodiment of the present disclosure comprises product database 180. In embodiments, backend data collector 110 can query product database 180 for specific data regarding a particular product. Data that backend data collector 110 can receive from product database 180 may include price information, product images (or a uniform resource locator ("URL") directed at a product image), pricing, a product page URL, and other potentially relevant product information.

In embodiments, trend database 120 comprises a non-relational database structure. In embodiments, trend database 120 comprises a NoSQL database such as a Cassandra database. In an embodiment, trend database 120 stores an aggregation of trend data that was collected and categorized by backend data collector 110. According to embodiments, data may be stored within trend database in sets based on the timestamp of the associated transaction, social message, other trend action, and/or based on the product category.

In embodiments, the product category refers to general potential uses or characteristics of a product. In embodiments, examples of product categories may include "apparel," "electronics," "toys," "grocery," and "sports." In embodiments, additional product categories may be included. Some products may fall under two or more categories.

Figure 2A:
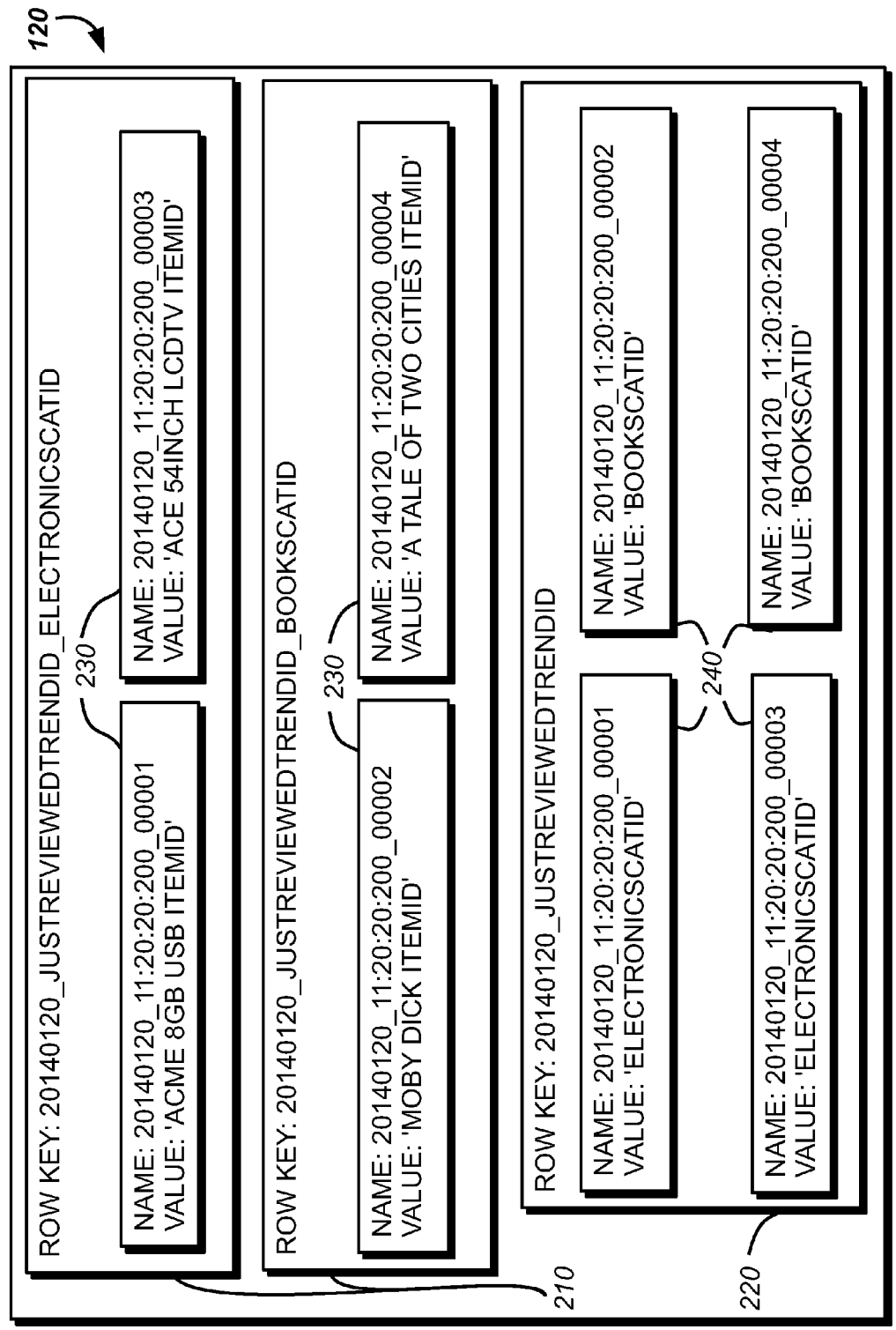
FIGS. 2A and 2B are illustrations of a trend database according to embodiments of the present disclosure.
Figure 2B:
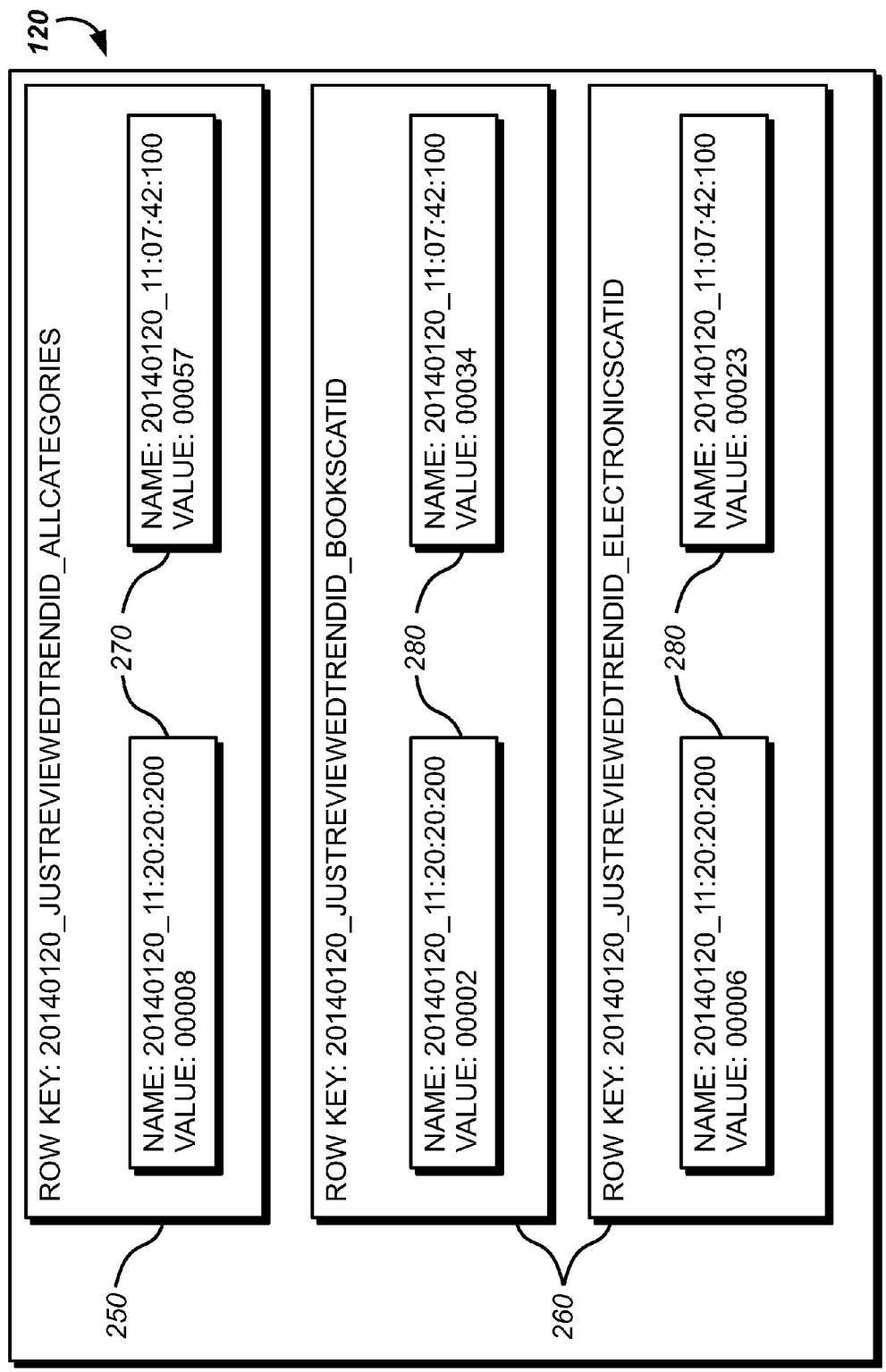

According to an embodiment of the present disclosure, trend data may be stored in four different types of rows within trend database 120. In embodiments, the data is inserted in trend database 120 as part of a batch, which may also be referred to herein as a "run." Referring now to FIGS. 2A and 2B, the types of rows may be referred to herein as a "category row" 210, a "trend type row" 220, an "update row" 250, and a "category update row" 260.

Each row type 210, 220, 250, 260 comprises a key and one or more columns. In particular, embodiments of trend database 120 have, as the key for each category row 210, a date concatenated with a trend type and a product category name (or other category identifier). For example, a key may be "20140120_JUSTREVIEWEDTRENDID_ELECTRONICSCATID" for a category row 210 for products that were inserted into trend database 120 during a run on Jan.

20, 2014, which were identified as "just reviewed," and which fall under the "electronics" category.

As data is sorted into trend database 120, multiple product columns 230 may be inserted or updated in each category row 210. While the run is active, new product column 230 names and values can be inserted into the category row 210. After a run has completed for a particular category and date, a new run may begin. In embodiments, each name of a product column 230 comprises a concatenation of a timestamp and a counter value. The timestamp in each name of a product column 230 corresponds to the initialization time of the current run. The counter value corresponds to the number of total products that are the subject of a trend action that have been identified and inserted into trend database 120 during the current run. For example, a name may be "20140120_11:20:20:200_00004" for a product column 230 that represents a product and trend activity and that was inserted into trend database 120 during a run that commenced on Jan. 20, 2014 at 11:20:20:200, and for which four total products have been identified so far during that run. In an embodiment of a category row 210, the counter value in the name of the first product column 230 is initialized at 1 at the start of each scheduled run and incremented for each new product column 230 created in trend database 120 during the run. In an embodiment, each category row 210 has product columns 230 ordered by their respective timestamps and counter values, thereby resulting in a chronologically-ordered record of trend data.

Each value of a corresponding product column 230 comprises an identifier of a particular product that falls under the trend action and category denoted in the key of the category row 210 and that was identified within data collected by backend data collector 110 during the batch that commenced at the time indicated in the timestamp of its product column 230. For example, a value may be 'ACME 8 GB USB ITEMID' for a product column 230 for products fitting the "ACME 8 GB USB" identifier.

Embodiments of trend database 120 have, as the key for each trend type row 220, a date concatenated with a trend type identifier. Examples of various trend types that can be identified in a trend type row 220 key include: best-rated products, newly pinned products, best seller products, recently reviewed products, just sold products, and products mentioned in other social platforms. For example, a key may be "20140120_JUSTREVIEWEDTRENDID" for a trend type row 220 for categories that were inserted into trend database 120 during a scheduled run on Jan. 20, 2014, which were identified as "just reviewed."

As data is sorted into trend database 120, multiple category columns 240 may be inserted or updated in each trend type row 220. In embodiments, a name of a category column 240 comprises a concatenation of a timestamp and a counter value. The timestamp in each name of a category column 240 corresponds to the initialization time of the run. The counter value corresponds to the number of total products that are the subject of a trend action that have been identified and inserted into trend database 120 during the current run. For example, a name may be "20140120_11:20:20:200_00004" for a category column 240 for a category that was inserted into trend database 120 during a run that commenced on Jan. 20, 2014 at 11:20:20:200, and for which four total products have been identified so far during that run. In an embodiment of a trend type row 220, the counter value in the name of the first category column 240 is initialized at 1 at the start of each run and incremented for each new category column 240 created in trend database 120 during the run. As a result, in embodiments, each category column 240 has a corresponding product column 230 with a matching name; the pair of columns 230, 240 represents a single trend action. In an embodiment, each trend type row 220 has category columns 240 ordered by their respective timestamps and counter values, thereby resulting in a chronologically-ordered record of trend data.

Each value of the category column 240 comprises an identifier of a particular category that falls under the trend action denoted in the key of the trend type row 220 and that was identified within data collected by backend data collector 110 during the current run that commenced at the time indicated in the timestamp of its category column 240. For example, a value may be 'ELECTRONICSCATID' for a category column 240 for categories fitting the "electronics" identifier.

As data is sorted into trend database 120, multiple update columns 270 may be inserted or updated in each update row 250. In embodiments of the present disclosure, the key for each update row 250 comprises a date concatenated with a trend type identifier and a string that signifies that the row includes data for all categories. For example, a key may be "20140120 JUSTREVIEWEDTRENDID_ALLCATEGORIES" for an update row 250 for items that were inserted into trend database 120 during a scheduled run on Jan. 20, 2014, which were identified as "just reviewed" and comprises an aggregate of all product categories In embodiments, the name of each update column 270 comprises a timestamp that corresponds to the initialization time of the current run. For example, a name of a update column 270 may be "20140120_11:20:20:200" for an entry that represents a product and trend activity and that was inserted into trend database 120 during a run that commenced on Jan. 20, 2014 at 11:20:20:200. The value of the update column 270 is a count of trend actions that fall under the trend type identified in the key of the update row 250 and that have been input into trend database 120 across all categories during the present run. In an embodiment of the present disclosure, the value of an update column 270 is initialized at 1 at the start of each scheduled run (for example, when an entry is made into trend database 120) and incremented for each new product entry created in trend database 120 that fits the parameters of the key of the update row 250 during the run. Accordingly, the update row 250 records the number of updates that occurred: during the current run, under a specific trend type, and for all categories.

As data is sorted into trend database 120, multiple category update columns 280 may be inserted or updated in each category update row 260. In embodiments of the present disclosure, the key for each category update row 260 comprises is a date concatenated with a trend type and a product category name (or other category identifier). For example, a key may be "20140120_JUSTREVIEWEDTRENDID_ELECTRONICSCATID" for a category update row 260 for products that were inserted into trend database 120 during a run on Jan. 20, 2014, which were identified as "just reviewed," and which fall under the "electronics" category.

In embodiments, the name of each category update column 280 comprises a timestamp that corresponds to the initialization time of the current run. For example, a name of a category update column 280 may be "20140120_11:20:20:200" for an entry that represents a product and trend activity and that was inserted into trend database 120 during a run that commenced on Jan. 20, 2014 at 11:20:20:200. The value of the category update column 280 is a count of trend actions that fall under the trend type and category identified in the key of the category update row 260 and that have been input into trend database 120 during the present run. In an embodiment of the present disclosure, the value of a category update column 280 is initialized at 1 at the start of each scheduled run (for example, when an entry is made into trend database 120) and incremented for each new product entry created in trend database 120 that fits the parameters of the key of the category update row 260 during the run. Accordingly, the category update row 260 records the number of updates that occurred: during the current run, under a specific trend type, and for the category set forth in the key of that particular category update row 260.

Figure 3:
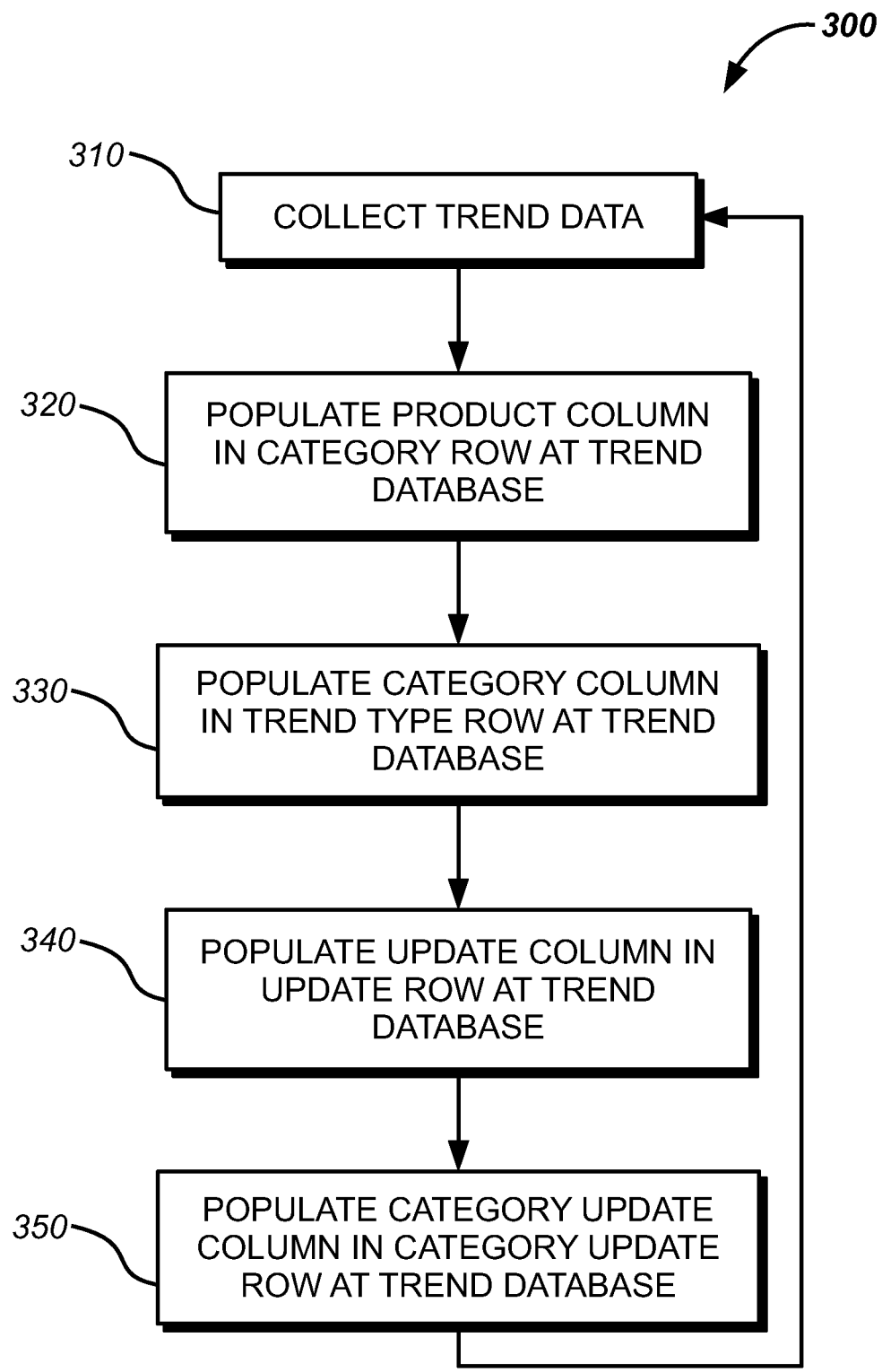
FIG. 3 is an illustration of an example method for collecting, sorting, and recording trend data.

In operation, data from heterogeneous sources may be aggregated and delivered in real-time or near real-time and filtered according to user selection. Referring now to FIG. 3, embodiments of the present disclosure comprise a method 300 for collecting, sorting, and recording trend data. At operation 310, backend data collector 110 gathers data from a variety of data sources. For example, backend data collector 110 receives, from transaction database 160, data relating to completed transactions. Additionally, backend data collector 110 traverses social data sources 150 for mentions of any products. As another example, backend data collector 110 receives, from product review sources 170, one or more reviews of a product. In an embodiment, backend data collector 110 is adapted to retrieve data related only to products that are offered for sale by a particular merchant. In another embodiment, backend data collector 110 is adapted to retrieve data related only to products that are offered for sale on a website by a merchant. In another embodiment, data may be gathered regarding virtually any product regardless of where the product is offered for sale.

At operation 320, data that was gathered by backend data collector 110 is sorted and recorded at trend database 120 by creating a product column 230 in a category row 210. In an embodiment, a new category row 210 is created each day for each trend type and product category combination that is identified in the data. In other embodiments, new category rows 210 are created at other time intervals. A new product column 230 is created and appended at the end of the appropriate row 210 for each product trend action that is identified. As described above, the name of a product column 230 comprises the timestamp corresponding to the commencement of the run, concatenated with a counter value. The counter value for the name of each product column 230 is incremented to reflect how many products were identified during that scheduled run. The value of each product column 230 is set to be a product identifier for the product At operation 330, data that was gathered by backend data collector 110 is sorted and recorded at trend database 120 by creating a category column 240 in a trend type row 220. In an embodiment, a new trend type row 220 is created each day (or other selected time periods) for each trend type identified in the data. A new category column 240 is created and appended at the end of the appropriate row 220 for each product that is identified. The name for each category column 240 comprises the timestamp corresponding to the commencement of the run, concatenated with a counter value. The counter value is incremented to reflect how many products were identified during that scheduled run.

At operation 340, data that was gathered by backend data collector 110 is sorted and recorded at trend database 120 by creating or incrementing a counter value of an update column 270 in an update row 250. In an embodiment, a new update row 250 is created each day (or other selected time periods). A new update column 270 is created for each batch that is run for each trend type. In an embodiment, the key of the update row 250 comprises the current date concatenated with a trend type identifier. The name of an update column 270 comprises the timestamp for the current batch. The value of an update column 270 comprises a counter value that is incremented for each product identified and input to trend database 120 having the trend action type denoted in the key of update row 250.

At operation 350, data that was gathered by backend data collector 110 is sorted and recorded at trend database 120 by creating or incrementing a counter value of a category update column 280 in a category update row 260. In an embodiment, a new category update row 260 is created each day (or other selected time periods). A new category update column 280 is created for each batch that is run for each combination trend type and category. In an embodiment, the key of the category update row 260 comprises the current date concatenated with a trend type identifier and a category identifier. The name of a category update column 280 comprises the timestamp for the current batch. The value of a category update column 280 comprises a counter value that is incremented for each product identified and input to trend database 120 having the combined trend action type and category type denoted in the key of category update row 260.

As a result of method 300, the trend database 120 may include trend type rows 220 having category columns 240 sorted by timestamp and counter, category rows 210 having product columns 230 also sorted by matching timestamps and counters, update rows 250 having update columns 270 having a count of trend actions for all categories added during a batch, and category update rows 260 having a count of trend actions for a specific category added during a batch. Operations 310, 320, 330, 340, and 350 may then be repeated as backend data collector 110 continues to seek and/or receive product reviews, mentions, and transactions.

Figure 4:
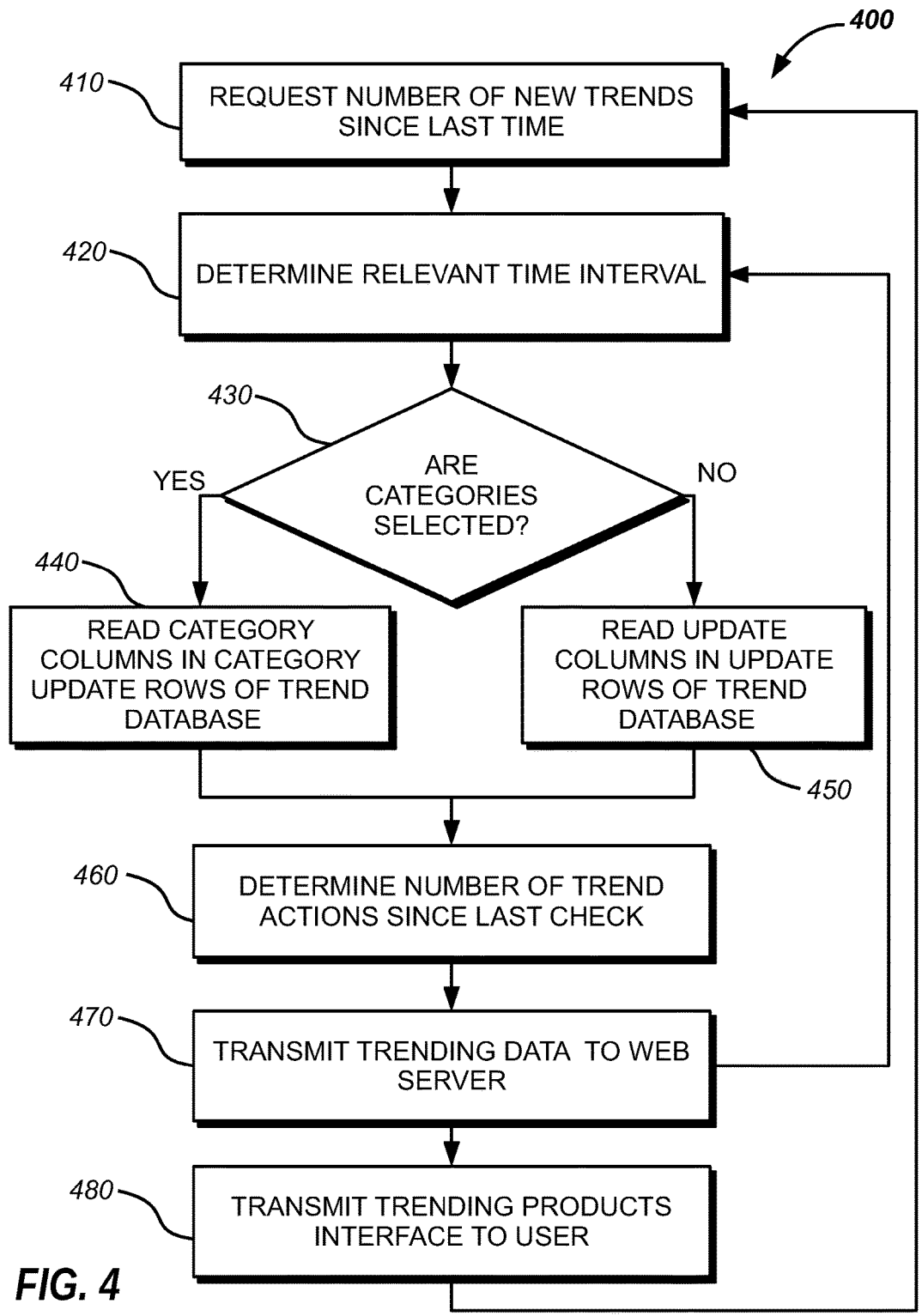
FIG. 4 is a flow chart illustrating a method for displaying trending products in accordance with embodiments of the present disclosure.

Referring now to FIG. 4, a method 400 for displaying trending products and related data to a user is illustrated. At operation 410, web server 140 requests an updated count of new trending products from trend server 130. In an embodiment, the query may particularly request the number of new trends since the previous request. Such a request may indicate any category and/or trend type filters to be applied, as selected by the user. Alternatively, the user may select that no filter be applied, in which case the request is for all trend type actions for products in all categories.

At operation 420, trend server 130 determines the relevant time interval for the present request. In embodiments, the relevant time interval is the time interval starting at the most recent request for trend data from that particular customer and ending at the present time. In an embodiment, the "most recent request" is the most recent time that the customer clicked on the new trend object. In another embodiment, the "most recent request" is the most recent time that the web server 140 queried trend server 130 for recent trend actions.

At operation 430, trend server 130 determines if any categories were selected to be filtered out in the request. At operation 440, if one or more categories were selected to be filtered, trend server 130 reads category columns 280 in the category update row(s) 260 having a timestamp within the relevant time interval. If the user has filtered out any trend types, then trend server 130 can review only those update rows 250 having the selected trend type(s) as the row key. At operation 450, if no categories were selected to be filtered, trend server 130 reads update columns 270 in the update rows 250 having a timestamp within the relevant time interval. If the user has filtered out any trend types, then trend server 130 can review only those update rows 250 having the selected trend type(s) as the row key.

At operation 460, trend server 130 reads values of update columns 270 and/or category update columns 280 to determine how many trend actions have been recorded in a selected preceding time interval, for example, in the intervening time since trend data were last checked. In an embodiment, trend server 130 can calculate the trend action count for specific category type filters by fetching category-specific counts from matching category update column(s) 280 that have a timestamp during the relevant time interval. If a request from web server 140 specifies trend type filers but not category filters, then trend server 130 can fetch the update column(s) 270 having a matching row 250 key for trend type filters, if any. Upon retrieving the counts for the selected time interval, trend server 130 can sum the counts to calculate the total number of trend actions that occurred over the given time period for the provided category and/or trend type filters, if any.

At operation 470, trend server 130 transmits to web server 140 the number of new trend actions recorded since the last check, as calculated at operation 460. In embodiments, the number of new trend actions is filtered according to a current filtering selection by the customer for category, trend type, or a combination thereof.

At operation 480, web server 140 transmits computer-readable signals to the user computing device 190, directing the computing device 190 to display the products identified by trend server 130 and the trend action count calculated. In embodiments, web server 140 can query product database 180 for product-specific information, including pricing information, stock availability at a specific retail location, review score, and the like. Such information may then be displayed to the user.

Web server 140 may query trend server 130 for multiple products, to which trend server 130 can respond by repeating operations 420, 430, 440, and 450. For example, in an embodiment, web server 140 requests 18 trending products to display on a user's interface. In response, trend server 130 searches trend database 120 according to methods disclosed herein until 18 products are identified according to the filtering parameters, if any, supplied in the request by web server 140. Results can be displayed on a user interface according to an "infinite scrolling" scheme, wherein as a user scrolls to the bottom of a display set on a web page (comprising, for example, 18 trending products from a selected time slot) a new set from a earlier time slot is loaded and displayed below. The user interface can include a representation of the trend action count as calculated in operation 440 so that the customer may be incentivized to refresh the trend action. In an embodiment, the representation of the trend action count can display an on-screen number reflecting the trend action count. In one embodiment, if the trend action count exceeds 99, the user interface may display "99+." In embodiments, once a customer selects to view the most recent trend actions reflected in the trend account count, the trend action count can then be set to zero and the next time a trend action count is calculated, a new time interval can be used. In one embodiment, the new time interval begins at the time the trend action count was set to zero.

In an embodiment, a user may request to view only trends according to one or more selected trend types, product categories, or combinations thereof. In response, trend server 130 can search only trend type rows 220 having matching trend types in the row key, thereby filtering out any unselected trend types. Trend server 130 can then filter out any unselected product categories by searching only category rows 210 having selected categories in the row key.

In an embodiment of the present disclosure, trend server 130 can consider known information about the customer in making a determination of which products and trend types to display. Such information about the customer may include past website browsing behavior, demonstrated interests, and/or prior purchases.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. A computer-implemented method comprising:
   at a backend data collector, searching two or more heterogeneous sources from two or more external third parties for one or more mentions of a product associated with a trend action of one or more trend actions;
   at the backend data collector, identifying text strings from the two or more heterogeneous sources from the two or more external third parties associated with the one or more mentions of the product associated with the trend action of the one or more trend actions;
   at the backend data collector, aggregating the text strings from the two or more heterogeneous sources from the two or more external third parties;
   at the backend data collector, analyzing the text strings comprising the one or more mentions of the product associated with the trend action of the one or more trend actions to determine when each of the one or more mentions of the product associated with the trend action of the one or more trend actions comprises:
   a positive mention; or
   a negative mention;
   at the backend data collector, assigning a score to the each of the one or more mentions of
   the product associated with the trend action of the one or more trend actions based at least in part on when the each of the one or more mentions of the product associated with the trend action of the one or more trend actions comprises the positive mention or the negative mention;
   at the backend data collector, receiving a dataset regarding the trend action of the one or more trend actions, the dataset comprising:
   a product identifier;
   a category identifier;
   a trend type action; and
   the score of the each of the one or more mentions of the product associated with the trend action of the one or more trend actions;
   at the backend data collector, sorting the dataset to populate a product column of one or more product columns in a category row of a trend database by inserting at least the product column of the one or more product columns in the category row, wherein:
   a key for the category row comprises the category identifier;
   a value for the product column comprises the product identifier;
   the category identifier represents a product category; and the product identifier represents a product of one or more trending products within the product category, the one or more trending products comprising the product;

at the backend data collector, sorting the dataset to populate a category column of one or more category columns in a trend type row of the trend database by inserting at least the category column of the one or more category columns in the trend type row, wherein:
  a key for the trend type row comprises the trend type action;
  a value for the category column comprises the category identifier; and
  each category column of the one or more category columns comprises a corresponding product column of the one or more product columns, the each category column of the one or more category columns and the corresponding product column of the one or more product columns represent the trend action of the one or more trend actions;

at the backend data collector, sorting the dataset to populate an update column in an update row of the trend database by inserting at least the update column in the update row, wherein:
  a key for the update row comprises the trend type action; and
  a value for the update column comprises a count of trend actions of the one or more trend actions that fall under the trend type action;

at the backend data collector, sorting the dataset to populate a category update column in a category update row of the trend database by inserting at least the category update column in the category update row, wherein:
  a key for the category update row comprises the trend type action and the category identifier; and
  a value for the category update column comprises a count of trend actions that fall under the trend type action and the category identifier;

receiving a query from an application on a user device of a user for the one or more trending products;

at the trend database, searching the category column of the one or more category columns, thereby identifying the product category;

at the trend database, searching the product column of the one or more product columns, thereby identifying the product;

at the trend database, searching at least one of the update column or the category update column to calculate a trend action count associated with the trend type action;

at a trend server, filtering the trend action count associated with the trend type action by applying a trend type action filter or a product category filter previously selected by the user, wherein:
  when a particular product category filter is applied, filtering the category update column in the category update row within a pre-determined time interval by the particular product category filter; or
  when a particular trend type action filter is applied, filtering the update column in the update row for a particular trend type within the pre-determined time interval by the particular trend type action filter;

from the trend server, transmitting the trend action count, as filtered and as associated with the trend type action and a set of trending products of the one or more trending products, to the user in response to the query, the set of trending products comprising the product identifier;

from the trend server, displaying on a graphical user interface of the user device of the user a counter comprising an on-screen number indicating a count of the one or more trend actions accumulated during a period of time;

after displaying the one or more trend actions on the graphical user interface of the user device, from the trend server, re-setting the counter of the on-screen number to zero to restart the count of the one or more trend actions;

from the trend server, displaying the one or more trending products of the one or more trend actions on the graphical user interface, wherein the user scrolls through the one or more trending products on a screen of the graphical user interface; and after the user scrolls through an end of the one or more trending products on the screen of the graphical user interface, from the trend server, displaying one or more other trend actions counted during at least one or more previous periods of time on the screen of the graphical user interface, wherein the user continues to scroll through one or more other trending products from the one or more other trend actions displayed.

2. The computer-implemented method of claim 1, wherein:
  the dataset further comprises a timestamp.

3. The computer-implemented method of claim 2, wherein:
  a key for the product column of the one or more product columns comprises the timestamp;
  a key for the category column of the one or more category columns comprises the timestamp;
  a key for the update column comprises the timestamp; and
  a key for the category update column comprises the timestamp.

4. The computer-implemented method of claim 1, wherein:
  a key for the product column of the one or more product columns comprises a counter value;
  a key for the category column of the one or more category columns comprises the counter value; and
  the computer-implemented method further comprises:
    initializing the product column of the one or more product columns and setting the counter value to one; and
    initializing the category column of the one or more category columns and setting the counter value to one.

5. The computer-implemented method of claim 1, wherein:
  the trend action of the one or more trend actions comprises one of a group consisting of:
    best-rated products;
    newly pinned products;
    best seller products;
    recently reviewed products;
    just sold products; and
    products mentioned in other social platforms.

6. The computer-implemented method of claim 1, wherein:
  a key for the product column of the one or more product columns comprises a concatenation of a timestamp and a counter value;
  a key for the category column of the one or more category columns matches the key for the product column;

the counter value corresponds to a count of occurrences of products in the dataset during the pre-determined time interval, the products comprising the product; and the timestamp reflects a start of the pre-determined time interval.

7. A system comprising:

a trend database comprising:
- a trend type row, comprising at least one category column of one or more category columns;
- a category row, comprising at least one product column of one or more product columns;
- an update row, comprising at least one update column of one or more update columns;
- a category update row, comprising at least one category update column of one or more category update columns;

a backend data collector adapted to:
- search two or more heterogeneous sources from two or more external third parties for one or more mentions of a product associated with a trend action of one or more trend actions;
- identify text strings from the two or more heterogeneous sources from the two or more external third parties associated with the one or more mentions of the product associated with the trend action of the one or more trend actions;
- aggregating the text strings from the two or more heterogeneous sources from the two or more external third parties;
- analyze the text strings comprising the one or more mentions of the product associated with the trend action of the one or more trend actions to determine when each of the one or more mentions of the product associated with the trend action of the one or more trend actions comprises:
  - a positive mention; or
  - a negative mention;
- assign a score to the each of the one or more mentions of the product associated with the trend action of the one or more trend actions based at least in part on when the each of the one or more mentions of the product associated with the trend action of the one or more trend actions comprises the positive mention or the negative mention;
- receive a dataset regarding the trend action of the one or more trend actions, the dataset comprising:
  - a product identifier;
  - a category identifier;
  - a trend type action; and
  - the score of the each of the one or more mentions of the product associated with the trend action of the one or more trend actions;
- sort the dataset to populate the at least one product column of the one or more product columns in the category row of the trend database by inserting the at least one product column of the one or more product columns in the category row, wherein:
  - a key for the category row comprises the category identifier and a trend type;
  - a value for the at least one product column comprises the product identifier;
  - the update row has a key comprising the trend type;
  - the category identifier represents a product category;
  - the product identifier represents a product within the product category; and
  - the category update row has a key comprising the trend type and the category identifier;
- sort the dataset to populate the at least one category column of the one or more category columns in the trend type row of the trend database by inserting the at least one category column of the one or more category columns in the trend type row, wherein:
  - a key for the trend type row comprises the trend type action;
  - a value for the category column comprises the category identifier;
  - the at least one update column of the one or more update columns has a value comprising a count of trend actions that fall under the trend type; and
  - the at least one category update column has a value comprising a count of trend actions that fall under the trend type and the category identifier;
- each category column of the one or more category columns comprises a corresponding product column of the one or more product columns, the each category column of the one or more category columns and the corresponding product column of the one or more product columns represent the trend action of the one or more trend actions; and a trend server adapted to:
- receive a query from an application on a user device of a user for one or more trending products, the one or more trending products comprising the product;
- search the trend database to identify at least one trending product of the one or more trending products and calculate a trend action count associated with the trend type action by:
  - search the category column of the one or more category columns, thereby identifying the product category; and
  - search a product column of the one or more product columns, thereby identifying the product;
- filter the trend action count associated with the trend type action by applying a trend type action filter or a product category filter previously selected by the user, wherein:
  - when a particular product category filter is applied, filtering a category update column in the category update row within a pre-determined time interval by the particular product category filter; or
  - when a particular trend type action filter is applied, filtering an update column in the update row for a particular trend type within the pre-determined time interval by the particular trend type action filter;
- transmit the trend action count, as filtered and as associated with the trend type action and a set of trending products of the one or more trending products, to the user in response to the query, the set of trending products comprising the product identifier;
- from the trend server, displaying on a graphical user interface of the user device of the user a counter comprising an on-screen number indicating a count of the one or more trend actions accumulated during a period of time;
- after displaying the one or more trend actions on the graphical user interface of the user device, from the trend server, re-setting the counter of the on-screen number to zero to restart the count of the one or more trend actions;
- from the trend server, displaying the one or more trending products of the one or more trend actions on the graphical user interface, wherein the user scrolls through the one or more trending products on a screen of the graphical user interface; and after the user scrolls through an end of the one or more trending products on the screen of the graphical user interface, from the trend server, displaying one or more other trend actions counted during at least one or more previous periods of time on the screen of the graphical user interface, wherein the user continues to scroll through one or more other trending products from the one or more other trend actions displayed.

8. The system of claim 7, further comprising a web server adapted to:
   receive the product identifier from the trend server;
   receive a sum of at least one count of trend actions; and
   transmit the graphical user interface to the user device for display to the user.

9. The system of claim 7, wherein:
   the trend type comprises one of a group consisting of:
     best-rated products;
     newly pinned products;
     best seller products;
     recently reviewed products;
     just sold products; and
     products mentioned in other social platforms.

10. A method comprising:
   at a backend data collector, searching two or more heterogeneous sources from two or more external third parties for one or more mentions of a product associated with a trend action of one or more trend actions;
   at the backend data collector, identifying text strings from the two or more heterogeneous sources from the two or more external third parties associated with the one or more mentions of the product associated with the trend action of the one or more trend actions;
   at the backend data collector, aggregating the text strings from the two or more heterogeneous sources from the two or more external third parties;
   at the backend data collector, analyzing the text strings comprising the one or more mentions of the product associated with the trend action of the one or more trend actions to determine when each of the one or more mentions of the product associated with the trend action of the one or more trend actions comprises:
     a positive mention; or
     a negative mention;
   at the backend data collector, assigning a score to the each of the one or more mentions of the product associated with the trend action of the one or more trend actions based at least in part on when the each of the one or more mentions of the product associated with the trend action of the one or more trend actions comprises the positive mention or the negative mention;
   at a trend database, receiving a dataset regarding the trend action of the one or more trend actions, the dataset comprising:
     a product identifier;
     a category identifier;
     a trend type; and
     the score of the each of the one or more mentions of the product associated with the trend action of the one or more trend actions;
   at the trend database, generating a product column in a category row in the trend database by inserting at least the product column in the category row, wherein:
     the category row has a key comprising the trend type and the category identifier;
     the product column has a name comprising a timestamp and a counter value; and
     the product column has a value comprising the product identifier;
   at the trend database, generating a category column in a trend type row in the trend database by inserting at least the category column in the trend type row, wherein:
     the trend type row has a key comprising the trend type;
     the category column has a name comprising the timestamp and the counter value;
     the category column has a value comprising the category identifier; and
     the category column corresponds to the product column, and the category column and the product column represent the trend action of the one or more trend actions;
   at the trend database, generating an update column in an update row in the trend database by inserting at least the update column in the update row, wherein:
     the update row has a key comprising the trend type;
     the update column has a name comprising the timestamp; and
     the update column has a value comprising a count of trend actions of the one or more trend actions that fall under a trend type action;
   at the trend database, generating a category update column in a category update row in the trend database by inserting at least the category update column in the category update row, wherein:
     the category update row has a key comprising the trend type and the category identifier;
     the category update column has a name comprising the timestamp; and
     the category update column has a value comprising a count of trend actions that fall under the trend type and the category identifier
   receiving a query from an application on a user device of a user for one or more trending products, the one or more trending products comprising the product;
   at the trend database, searching the category column, thereby identifying a product category;
   at the trend database, searching the product column, thereby identifying the product;
   at the trend database, searching at least one of the update column or the category update column to calculate a trend action count associated with the trend type;
   at a trend server, filtering the trend action count associated with the trend type action by applying a trend type action filter or a product category filter previously selected by the user, wherein:
     when a particular product category filter is applied, filtering the category update column in the category update row within a pre-determined time interval by the particular product category filter; or
     when a particular trend type action filter is applied, filtering the update column in the update row for a particular trend type within the pre-determined time interval by the particular trend type action filter;
   from a trend server, transmitting the trend action count, as filtered and as associated with the trend type and a set of trending products, to the user in response to the query, the set of trending products comprising the product identifier;
   from the trend server, displaying on a graphical user interface of the user device of the user a counter comprising an on-screen number indicating a count of the one or more trend actions accumulated during a period of time;

after displaying the one or more trend actions on the graphical user interface of the user device, from the trend server, re-setting the counter of the on-screen number to zero to restart the count of the one or more trend actions;

from the trend server, displaying the one or more trending products of the one or more trend actions on the graphical user interface, wherein the user scrolls through the one or more trending products on a screen of the graphical user interface; and after the user scrolls through an end of the one or more trending products on the screen of the graphical user interface, from the trend server, displaying one or more other trend actions counted during at least one or more previous periods of time on the screen of the graphical user interface, wherein the user continues to scroll through one or more other trending products from the one or more other trend actions displayed.

11. The method of claim 10, wherein:
the key of the category row further comprises a date stamp; and
the key of the trend type row further comprises the date stamp.

12. The method of claim 10, wherein:
the trend type comprises one of a group consisting of:
best-rated products;
newly pinned products;
best seller products;
recently reviewed products;
just sold products; and
products mentioned in other social platforms.

13. The method of claim 10, further comprising:
transmitting a set of product identifiers to the user device of the user for display at the user device in response to the query.

14. The computer-implemented method of claim 1, wherein:
transmitting the set of trending products to the user comprises:
determining the set of trending products based at least in part on at least one of:
past website browsing behavior of the user;
one or more demonstrated interests of the user; or
one or more prior purchases by the user.

15. The computer-implemented method of claim 1, wherein:
the trend action of the one or more trend actions comprises one of a group consisting of:
best-rated products;
newly pinned products;
best seller products;
recently reviewed products;
just sold products; and
products mentioned in other social platforms;
transmitting the set of trending products to the user comprises:
determining the set of trending products based at least in part on at least one of:
past website browsing behavior of the user;
one or more demonstrated interests of the user; or
one or more prior purchases by the user;
the dataset further comprises a timestamp;

a key for the product column of the one or more product columns comprises a concatenation of the timestamp and a counter value;
a key for the update column comprises the timestamp;
a key for the category column of the one or more category columns matches the key for the product column;
a key for the category update column comprises the timestamp;
the counter value corresponds to a count of occurrences of products in the dataset during the pre-determined time interval, the products comprising the product;
the timestamp reflects a start of the pre-determined time interval; and
the computer-implemented method further comprises:
initializing the product column of the one or more product columns and setting the counter value to one; and
initializing the category column of the one or more category columns and setting the counter value to one.

16. The system of claim 7, wherein:
the trend server adapted to transmit the set of trending products to the user comprises:
determining the set of trending products based at least in part on at least one of:
past website browsing behavior of the user;
one or more demonstrated interests of the user; or
one or more prior purchases by the user.

17. The system of claim 7, wherein:
the dataset further comprises a timestamp;
a key for the at least one product column of the one or more product columns comprises the timestamp;
a key for the at least one category column of the one or more category columns comprises the timestamp;
a key for the at least one update column of the one or more update columns comprises the timestamp; and
a key for the at least one category update column of the one or more category update columns comprises the timestamp.

18. The system of claim 7, wherein:
a key for the at least one product column of the one or more product columns comprises a counter value; and
a key for the at least one category column of the one or more category columns comprises the counter value.

19. The system of claim 7, wherein:
the trend server adapted to transmit the set of trending products to the user comprises:
determining the set of trending products based at least in part on at least one of:
past website browsing behavior of the user;
one or more demonstrated interests of the user; or
one or more prior purchases by the user,
the dataset further comprises a timestamp;
a key for the at least one product column of the one or more product columns comprises the timestamp;
a key for the at least one category column of the one or more category columns comprises the timestamp;
a key for the at least one update column of the one or more update columns comprises the timestamp;
a key for the at least one category update column of the one or more category update columns comprises the timestamp;
the trend type comprises one of a group consisting of:
best-rated products;
newly pinned products;
best seller products;
recently reviewed products;

just sold products; and
products mentioned in other social platforms; and the system further comprises a web server adapted to:
- receive the product identifier from the trend server;
- receive a sum of at least one count of trend actions; and
- transmit the graphical user interface to the user device for display to the user.

20. The method of claim 10, wherein:

the key of the category row further comprises a date stamp; and the key of the trend type row further comprises the date stamp;

the trend type comprises one of a group consisting of:
- best-rated products;
- newly pinned products;
- best seller products;
- recently reviewed products;
- just sold products; and
- products mentioned in other social platforms; and the method further comprises:

transmitting a set of product identifiers to the user device of the user for display at the user device in response to the query.

* * * * *